(12) United States Patent
Naffziger et al.

(10) Patent No.: US 6,586,971 B1
(45) Date of Patent: Jul. 1, 2003

(54) ADAPTING VLSI CLOCKING TO SHORT TERM VOLTAGE TRANSIENTS

(75) Inventors: Samuel Naffziger, Fort Collins, CO (US); Eric S. Fetzer, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/020,114

(22) Filed: Dec. 18, 2001

(51) Int. Cl.$^7$ ............................................. H03D 13/00
(52) U.S. Cl. ........................................... 327/41; 327/44
(58) Field of Search .................................. 327/100, 291, 327/307, 512, 530, 39, 41, 44, 174, 175

(56) References Cited

U.S. PATENT DOCUMENTS

| | | | |
|---|---|---|---|
| 5,497,105 A | 3/1996 | Oh et al. .................... | 326/27 |
| 5,534,791 A | 7/1996 | Mattos et al. ............... | 326/27 |
| 5,726,596 A | 3/1998 | Perez ......................... | 327/292 |
| 5,914,618 A | 6/1999 | Mattos ....................... | 326/87 |
| 5,945,817 A * | 8/1999 | Nguyen ...................... | 323/273 |
| 6,211,740 B1 | 4/2001 | Dai et al. .................... | 331/2 |
| 6,242,961 B1 * | 6/2001 | Liu et al. .................... | 327/307 |
| 6,252,449 B1 | 6/2001 | Hanriat ....................... | 327/295 |
| 6,472,856 B2 * | 10/2002 | Groom et al. ............... | 323/284 |

* cited by examiner

*Primary Examiner*—My-Trang Nuton

(57) ABSTRACT

A system and method of compensating for voltage droop in an integrated circuit. The integrated circuit may include a plurality of chip circuits, a clock control system, a clock distribution network including at least one delay element and a voltage droop detector. The clock control system adapts cycle time in the clock distribution network through use of the at least one delay element when a voltage droop is detected. The method may include detecting a voltage droop in an integrated circuit where the integrated circuit is driven by a clock signal, determining an optimum frequency change to compensate for the voltage droop, and adapting cycle time of the clock signal in an incremental manner to achieve the optimum frequency change.

23 Claims, 6 Drawing Sheets

ADAPTING VLSI CLOCKING TO SHORT TERM VOLTAGE TRANSIENTS

FIELD OF THE INVENTION

The invention is generally related to very large scale integrated circuits. More particularly, the invention is related to compensating for voltage transients in very large scale integrated circuits.

BACKGROUND OF THE INVENTION

As silicon technology is scaled down in integrated circuit ("IC") design, the voltage at which the integrated circuit operates is also reduced. However, power consumption tends to increase for the scaled down ICs, increasing the current going through the power supply and the power delivery network.

Because of this large amount of current in integrated circuits, such as, for example, very large scale integrated ("VLSI") circuits used for microprocessor design, a large transient may occur in the power supply network due to switching events and instantaneous changes in the current function. This change in the current may cause the voltage to vary by a large percentage of the supply. A reduction in the operating voltage due to the change in current is known as a "voltage droop". Voltage droops may cause delays in circuit operation.

Traditionally, processors and most VLSI circuits operate at a fixed frequency, such as, for example, 1 GHz. Because of the frequency is fixed, the VLSI circuits should maintain the frequency of operation for the lowest voltage point that may be seen in the circuit. Thus, a voltage droop may require a VLSI circuit to operate at lower frequency than it could support if the frequency were based on the average voltage of operation.

SUMMARY OF THE INVENTION

A method for compensating for voltage droop in an integrated circuit is described. The method may include detecting a voltage droop in an integrated circuit driven by a clock signal and determining an optimum frequency change to compensate for the voltage droop. The method may further include adapting cycle time of the clock signal in an incremental manner to achieve the optimum frequency change.

An integrated circuit having voltage droop compensation capability is also described. The integrated circuit may include a plurality of chip circuits, a clock control system, a clock distribution network including at least one delay element and a voltage droop detector. In one embodiment, the clock control system may adapt cycle time in the clock distribution network through use of the at least one delay element when a voltage droop is detected.

BRIEF DESCRIPTION OF THE DRAWINGS

The invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the invention. However, it will be apparent to one of ordinary skill in the art that these specific details need not be used to practice the invention. In other instances, well known structures, interfaces, and processes have not been shown in detail in order not to obscure unnecessarily the invention.

Figure 1:
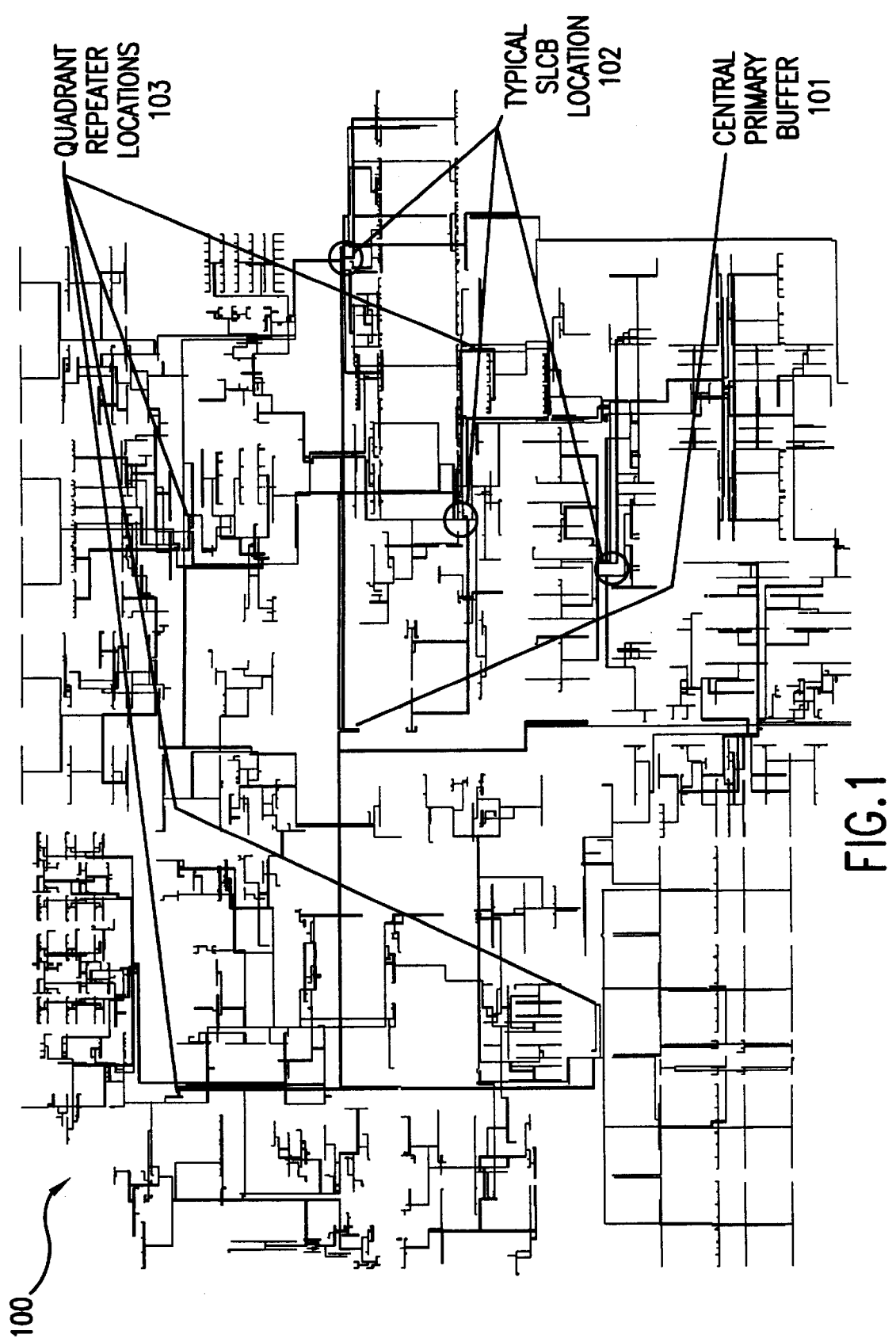
FIG. 1 is a schematic diagram illustrating an exemplary embodiment of a clock distribution system.

FIG. 1 is a schematic diagram illustrating an exemplary embodiment of a clock distribution system. The clock distribution system 100 is a typical clock distribution system for a VLSI circuit. The system 100 may include a central primary buffer 101, at least one second level control buffer ("SLCB") 102, and quadrant repeaters 103.

This figure indicates the complexity and span of an advanced microprocessor clock distribution. The buffer 101 initiates the clock distribution which proceeds along matched delay paths to the four quadrant repeaters 103. Each of these quadrant repeaters 103 includes a matched route out to a number of SLCBs 102 which provide the final level of buffering before contact with the local clock gating circuits. The span across this distribution is approximately 14 mm=18 mm. This is enough distance to accumulate large voltage differentials across a VLSI chip with transfer times of at least a nanosecond, which is larger than the clock cycle for high speed microprocessors.

Figure 2:
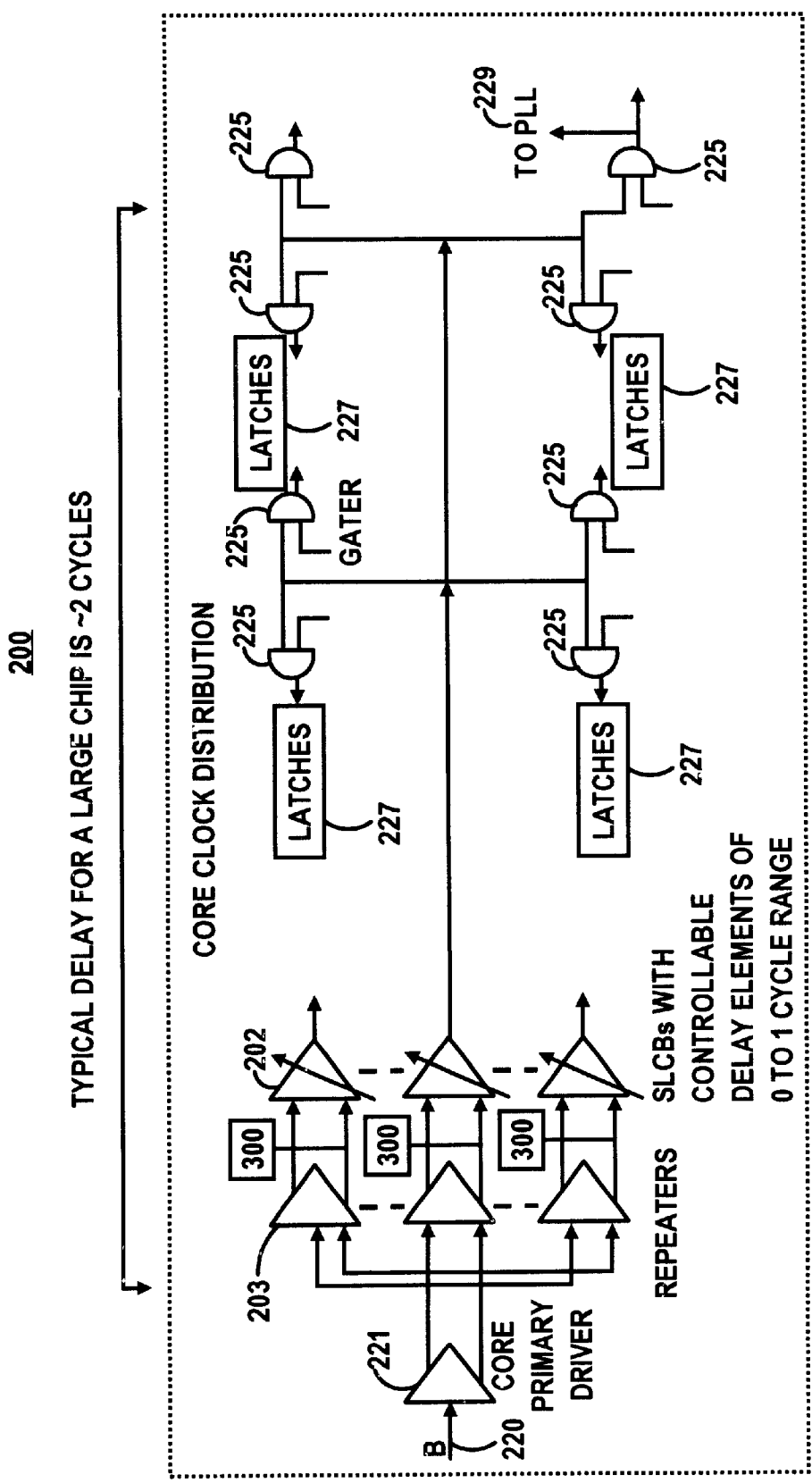
FIG. 2 is a circuit diagram illustrating an exemplary embodiment of a clock distribution circuit employing principles of an embodiment of the invention.

FIG. 2 is a circuit diagram illustrating an exemplary embodiment of a clock distribution circuit 200 employing principles of an embodiment of the invention. The clock distribution circuit 200 may receive a clock signal 220 as an input. The clock signal 220 is received by core primary driver 221 which transmits the clock signal to repeaters 203. The repeaters 203 transmit the clock signal to SLCBs 202. Although three SLCBs 202 are shown, the clock distribution circuit may include any number of SLCBs.

Each SLCB 202 may include at least one controllable delay element (not shown). In one embodiment, the controllable delay element(s) of the SLCB 202 may provide delays in the range of 0 to 1 cycle. A voltage droop indictor 300 may be connected to each SLCB 202 to invoke the controllable delay elements in response to detecting voltage droop.

Each SLCB 202 is coupled to a circuitry using the clock signal 220. The circuitry using the clock signal may include gates 225 and latches 227. The clock signal 220 is also forwarded to a phase locked loop 229, where the signal is taken as the clock feedback, enabling the elimination of the distribution delay from the clock phase.

Figure 3:
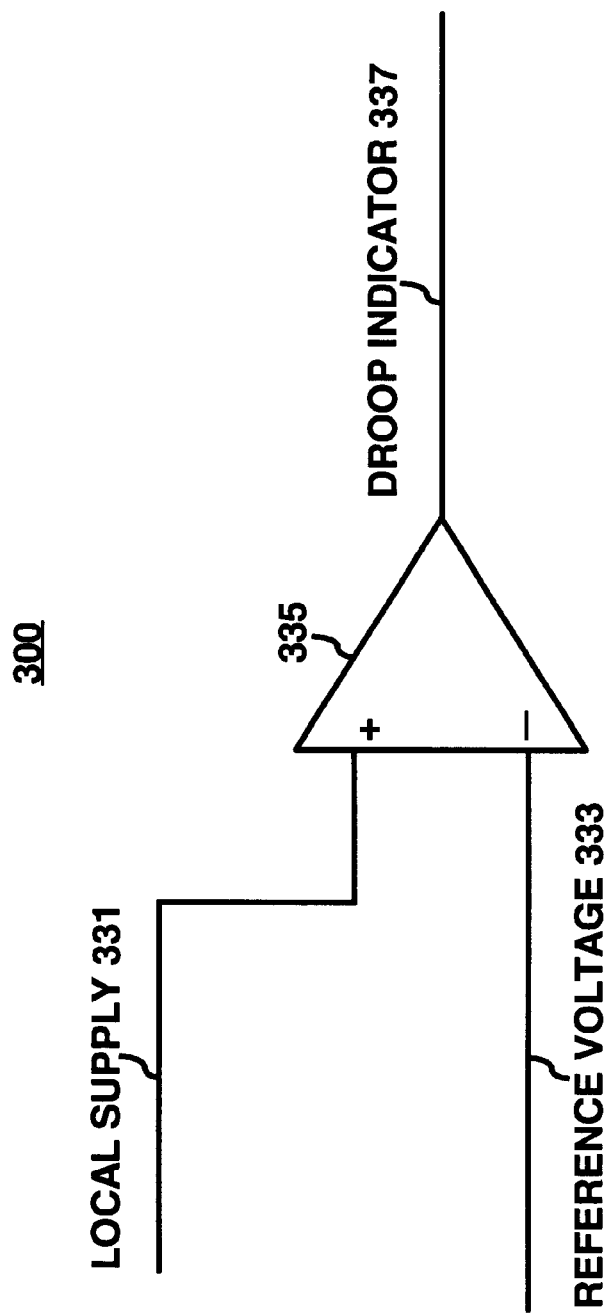
FIG. 3 is a circuit diagram illustrating one embodiment of a droop indicator for use with the clock distribution circuit of FIG. 2.

FIG. 3 is a circuit diagram illustrating one embodiment of the droop indicator 300 for use with the clock distribution circuit of FIG. 2. In one embodiment, the droop indicator 300 may detect voltage droop by monitoring the time relative changes of a voltage of operation of the integrated circuit 100. The droop indicator 300 may include an operational amplifier 335 to determine when a voltage droop occurs.

In one embodiment, the operational amplifier 335 may be a subtracting op amp having a positive input and a negative input. In the example shown, the operational amplifier 335 receives a voltage signal from a local supply as the first (positive) input 331 and a voltage signal from a reference voltage source as the second (negative) input 333. The output 337 of the operational amplifier 335 may indicate the polarity of a comparison of the first input 331 and the second input 333 (i.e. a high output may indicate input 331 is at a greater voltage potential than input 333, and a low output may indicate the reverse).

In one embodiment, these voltage droop indicator(s) 300 may be placed around the chip in sufficient quantity to quickly and accurately detect voltage droops that may originate from any circuits on the chip. Since SLCB 102 placements have already been arranged on the chip for the clock distribution and there are typically a large number (32 in FIG. 1), a voltage droop indicator may be included along with each SLCB in one embodiment.

Figure 4:
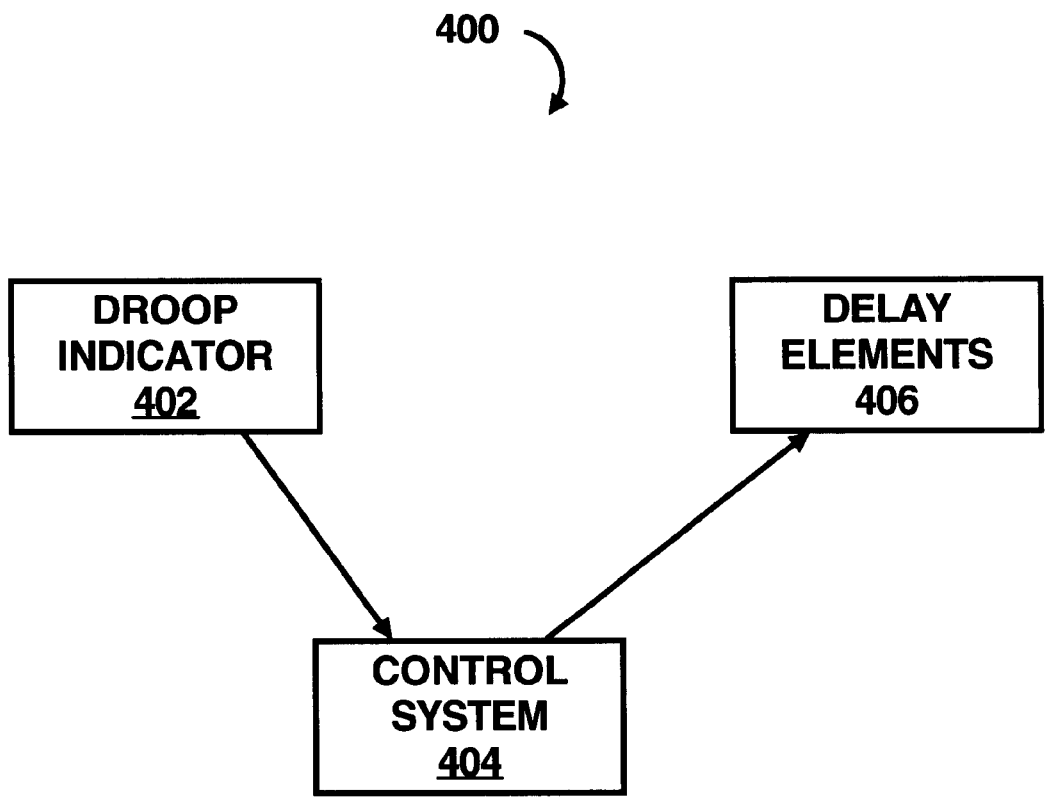
FIG. 4 is a block diagram illustrating one embodiment of a system for compensating for voltage droop in a VLSI circuit.

FIG. 4 is a block diagram illustrating one embodiment of a VLSI clocking adapting system 400. Adapting system 400 may include a droop indicator 402, a control system 404 and at least one delay element 406. The droop indicator 402 may be similar to the droop indicator 300 described above. The control system 404 may be similar to or include the control system for clock distribution circuit 200. Delay element(s) 406 may be or include a switched capacitor element, a current starved inverter, a switchable delay element or any other appropriate delay element that may be used with VLSI clock distribution circuit 200.

The droop indicator 402 may detect a droop in the operating voltage of clock distribution circuit 200. The control system 404 may receive the indication of a voltage droop from the droop indicator 402. The control system 404 may determine the optimum frequency to compensate for the voltage droop, and then activate one or more delay elements 406 as described below with respect to processing block 530 of FIG. 5. In one embodiment, the control system 404 may at least include the voltage droop indicator 402 and delay elements 406.

In an embodiment, shown in FIG. 2, the SLCB 202 may be connected to the voltage droop indicator 300 and delay elements for increasing cycle time in response to detecting voltage droop.

Figure 5:
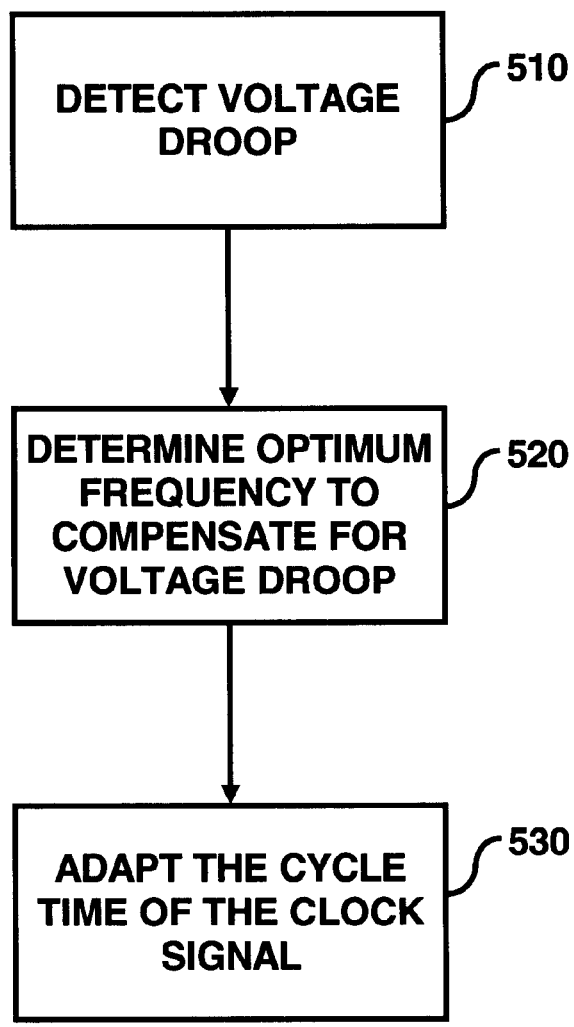
FIG. 5 is a flow diagram of one embodiment of a process for adapting a VLSI clocking circuit to a voltage droop.

FIG. 5 is a flow diagram of one embodiment of a process for adapting a VLSI clocking circuit to a voltage droop. At processing block 510, the droop indicator 300, 402 detects a voltage droop as described above with reference to FIG. 3. Since each droop indicator 300, 402 is associated with a SLCB 202, the following process will be performed with reference to the SLCB 202 with which the droop indicator 300,402 indicating the droop is associated.

At processing block 520, the control system 404 determines the optimum frequency for the SLCB 202 to operate as a result of the voltage droop. In one embodiment, the control system 404 may determine the optimum frequency change for the clock signal to compensate for the voltage droop.

At processing block 530, the control system 404 adapts the cycle time of the clock signal through the SLCB 202 associated with the droop indicator 300, 402 indicating the voltage droop. In one embodiment, the control system 404 uses delay elements 406 to implement changes in cycle time. For example, the control system 404 may add delays to the cycle time using delay elements 406 so that the cycle time of the clock signal through the clock distribution network is increased, thereby producing a temporary frequency reduction.

In one embodiment, the control system 404 may implement the change in frequency incrementally. For example, the control system 404 may increase the cycle time for all chip circuits in a progressive manner using a large range delay line including delay elements 406. Thus, if the frequency is to be decreased by 1%, the cycle times may be increased by 1%, then 2%, then 3%, etc. to effect the desired decrease in frequency. In one embodiment, the control system 404 may determine the number of cycles the delay lasts based on at least one of the amount of time the voltage droop lasts and the amount of time needed by the phase locked loop ("PLL"), or the source of the clock frequency, to respond to a request to reduce frequency. Thus, in this embodiment, either the voltage transient or droop goes away before the delay line range is consumed, or the clock system adjusts the actual clock frequency. The temporary decrease in frequency allows the PLL to have enough time to adjust the actual clock frequency if the voltage droop does not go away.

Figure 6:
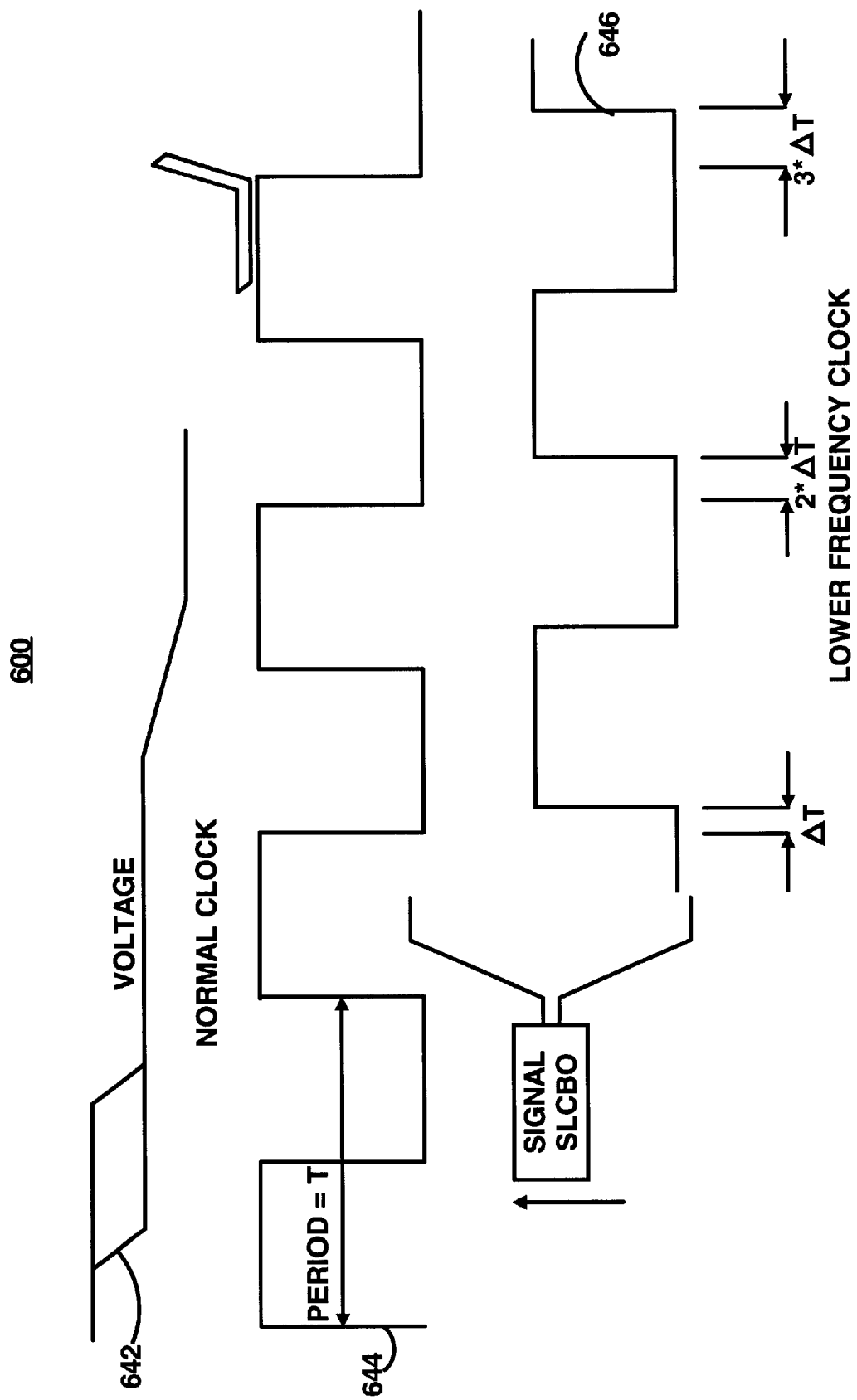
FIG. 6 is a graphic representation of the operation of an exemplary embodiment of the clock distribution circuit adapting in response to a voltage droop.

FIG. 6 is a graphic representation of the operation of an exemplary embodiment of the clock distribution circuit adapting in response to a voltage droop. At time 642, a voltage droop is detected by droop indicator 300, 402 associated with a SLCB 202.

As shown by signal 644, the normal clock signal at this time has a period of T. When the control system 404 receives indication of the voltage droop at time 642, the control system 404 determines an optimum frequency change. The control system 404 implements the optimum frequency change by progressively increasing the clock cycle time distributed by the SLCB 202 with which the voltage droop indicator 300, 402 indicating the voltage droop 642 is associated, as shown by signal 646. For example, the clock system adds a delay of $\Delta T$ to the first cycle after the droop is detected. The clock system then continues to add a delay of $2\Delta T$ to the second cycle, and a delay of $3\Delta T$ to the third cycle.

While this invention has been described in conjunction with the specific embodiments thereof, it is evident that many alternatives, modifications and variations will be apparent to those skilled in the art. These changes may be made without departing from the spirit and scope of the invention.

What is claimed is:

1. A method of compensating for voltage droop in an integrated circuit comprising:

detecting a voltage droop in an integrated circuit, the integrated circuit being driven by a clock signal;

determining an optimum frequency change to compensate for the voltage droop; and adapting cycle time of the clock signal in an incremental manner to achieve the optimum frequency change, wherein adapting the cycle time comprises increasing the cycle time by a determined value for a designated number of cycles.

2. The method of claim 1, wherein the designated number of cycles comprises one of the number of cycles the voltage droop lasts and the number of cycles until a phase locked loop producing the clock signal can respond to a request to reduce frequency.

3. The method of claim 1, wherein detecting the voltage droop comprises monitoring time relative changes of a voltage of operation for the integrated circuit.

4. The method of claim 1, wherein adapting the cycle time in an incremental manner comprises increasing the cycle time for all chip circuits in a progressive manner.

5. The method of claim 3, wherein increasing the cycle time comprises using a large range delay line to increase the cycle time.

6. The method of claim 1, wherein the integrated circuit comprises a very large scale integrated circuit.

7. An integrated circuit having voltage droop compensation capability comprising:

a plurality of chip circuits;

a clock control system;

a clock distribution network including at least one delay element; and a voltage droop detector, wherein the clock control system adapts cycle time of the clock signal through use of the at least one delay element when a voltage droop is detected by the voltage droop detector.

8. The integrated circuit of claim 7, wherein the clock control system determines an optimum frequency to compensate for the voltage droop detector.

9. The integrated circuit of claim 7, wherein the clock control system incrementally increases the cycle time of the clock signal through a designated number of cycles.

10. The integrated circuit of claim 9, wherein the designated number of cycles comprises one of the number of cycles the voltage droop lasts and the number of cycles until a phase locked loop producing the clock signal can respond to a request to reduce frequency.

11. The integrated circuit of claim 7, wherein the voltage droop detector comprises a operational amplifier having a first input of a local supply voltage and a second input of a reference voltage.

12. The integrated circuit of claim 7, wherein the clock control system comprises at least one second level clock buffer.

13. The integrated circuit of claim 12, wherein the clock control system comprises a plurality of second level clock buffers, each second level clock buffer having at least one associated delay element.

14. The integrated circuit of claim 13, wherein each second level clock buffer has an associated voltage droop indicator.

15. The integrated circuit of claim 7, wherein the at least one delay element comprises a controllable delay element.

16. A method of compensating for voltage droop in an integrated circuit comprising:

detecting a voltage droop in an integrated circuit, the integrated circuit being driven by a clock signal; and increasing a cycle time of the clock signal for a number of clock cycles in response to detecting the voltage droop.

17. The method of claim 16, wherein the number of cycles comprises one of a number of cycles the voltage droop is detected and a number of cycles for a phase locked loop producing the clock signal to increase the cycle time of the clock signal.

18. The method of claim 16, wherein detecting a voltage droop comprises monitoring time relative changes of a voltage of operation for at least one circuit in the integrated circuit.

19. The method of claim 18, further comprising driving the at least one circuit with the clock signal having the increased cycle time.

20. A system comprising:

means for detecting a voltage droop in an integrated circuit, the integrated circuit being driven by a clock signal; and means for increasing a cycle time of the clock signal for a number of clock cycles in response to detecting the voltage droop.

21. The system of claim 20, wherein the number of cycles comprises one of a number of cycles the voltage droop is detected and a number of cycles for a phase locked loop producing the clock signal to increase the cycle time of the clock signal.

22. The system of claim 20, wherein the means for detecting a voltage droop monitors time relative changes of a voltage of operation for at least one circuit in the integrated circuit.

23. The system of claim 22, further comprising means for driving the at least one circuit with the clock signal having the increased cycle time.

* * * * *